United States Patent
Frampton et al.

(10) Patent No.: US 11,353,087 B2
(45) Date of Patent: Jun. 7, 2022

(54) GRIPPING DEVICE FOR RETAINING A CABLE

(71) Applicant: Prysmian S.p.A., Milan (IT)

(72) Inventors: Simon James Frampton, Milan (IT); Kris Jonathan Roberts, Milan (IT); Arnaud Le Dissez, Milan (IT); Nathan Paddick, Milan (IT); Phil Wedgbrow, Milan (IT); Andrew Paul Barnes, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 17/133,848

(22) Filed: Dec. 24, 2020

(65) Prior Publication Data

US 2021/0199177 A1      Jul. 1, 2021

(30) Foreign Application Priority Data

Dec. 27, 2019    (IT) ........................ 102019000025591

(51) Int. Cl.
     *F16G 11/10*      (2006.01)

(52) U.S. Cl.
     CPC ................... *F16G 11/106* (2013.01)

(58) Field of Classification Search
     CPC ............................ Y10T 24/3918; F16G 11/106
     See application file for complete search history.

(56) References Cited

U.S. PATENT DOCUMENTS

| 3,574,900 | A | * | 4/1971 | Emery | ................. | F16G 11/103 |
| | | | | | | 24/130 |
| 4,120,077 | A | * | 10/1978 | Fink | ..................... | F16G 11/103 |
| | | | | | | 24/130 |
| 4,361,938 | A | * | 12/1982 | Emery | ................. | F16G 11/103 |
| | | | | | | 114/218 |

(Continued)

FOREIGN PATENT DOCUMENTS

| DE | 29702914 U1 | 4/1997 |
| GB | 2299462 A | 10/1996 |

OTHER PUBLICATIONS

International Business Machines Corp., "Fiber-Optic Cable Strain Relief Clamp," IBM Technical Disclosure Bulletin, vol. 32, No. 2, Jul. 1, 1989, 2 pages.

*Primary Examiner* — Robert Sandy
(74) *Attorney, Agent, or Firm* — Slater Matsil, LLP (57) ABSTRACT

A gripping device for retaining a cable includes a base, two opposed gripping arms projecting from the base towards respective end portions along an insertion direction and mutually spaced apart along a transversal direction perpendicular to the insertion direction. The gripping arms include retaining portions configured to receive the cable therebetween and insertion portions configured to allow insertion of the cable towards the retaining portions. The gripping device includes first protrusions projecting from the retaining portions, extending along a first direction angled with respect to the insertion direction and configured to act on the cable to retain the cable between the retaining portions. The gripping (Continued)

device includes second protrusions projecting from the insertion portions and extending along a second direction angled with respect to the insertion direction, where each of the second protrusions being tapered along the insertion direction towards the respective end portion.

20 Claims, 9 Drawing Sheets

(56) References Cited

U.S. PATENT DOCUMENTS

| | | |
|---|---|---|
| 4,397,253 A | 8/1983 | Uecker et al. |
| 5,522,120 A * | 6/1996 | Brinning ............... F16G 11/103 24/129 R |
| 6,269,523 B1 * | 8/2001 | Benoit ................. F16G 11/106 24/128 |
| 10,158,168 B2 | 12/2018 | Dundorf et al. |
| 2009/0249586 A1 | 10/2009 | Brown |
| 2017/0322387 A1 | 11/2017 | Abbiati |

* cited by examiner

GRIPPING DEVICE FOR RETAINING A CABLE

CROSS-REFERENCE TO RELATED APPLICATIONS

This application claims the benefit of Italian Patent Application No. 102019000025591 filed on Dec. 27, 2019, which application is hereby incorporated herein by reference.

TECHNICAL FIELD

The present invention relates to the field of equipment and components for the installation of optical cables to an optical (access) network, optical termination box or a distribution box. The present invention relates also to the field of equipment and components for the installation of the electrical cables to an electrical box.

BACKGROUND

A FTTH ("Fiber To The Home") network is an optical access network providing a number of end customers with broadband communication services from operators, i.e. with services requiring data transmission at a very high rate, for example of some Mbit/s.

Typically, a FTTH network comprises a termination box or cabinet which cooperates with an access network and which is typically located in the basement of the building where the end users reside. An optical trunk cable, hereinafter referred to as "riser cable", exits the termination box and runs through the building from the basement up to all the building floors.

At each floor of the building, the riser cable may be optically connected to one or more optical cables, hereinafter referred to as "drop cables". Each drop cable typically terminates at its far end into a respective customer optical termination box located within or in proximity of the apartment or office of an end user.

During installation of the optical termination box, the operator has to lay down the drop cable from a distribution cabinet to the apartment of the end user where the operator has to cut the drop cable and connect the optical fibers to optical connectors by means of optical fiber splices.

Therefore, there is a demand from the operator during installation operations to easily and firmly connect the optical cables to the termination box.

GB 2299462 discloses a cord grip for an electrical accessory in which a first member having a first cable gripping surface is biased towards a second member having a second gripping surface so that the cable to be gripped lies between the gripping surfaces. In order to prevent the gripping surfaces drifting relative to each other in a plane roughly parallel to the gripping planes so that the cable "walks" out of the grip, a protrusion is provided at one end of each gripping surface which extends towards the opposition gripping surface.

DE 29702914 discloses a clamping device for a cable or the like. The clamping device comprises a clamping part provided with a trapezoidal groove in cross-section, in which the side walls of the groove are provided with downwardly directed saw-toothed projections. The latter are obliquely inclined in the direction of the expected train toward the bottom of the groove.

The above mention gripping devices complicate the installation operations of the optical cable to the termination box. Furthermore, the known devices do not provide a sufficient tension and torsion resistance to the retained optical cable.

SUMMARY

In one embodiment, a gripping device for retaining a cable includes a base, two opposed gripping arms projecting from the base towards respective end portions along an insertion direction and mutually spaced apart along a transversal direction perpendicular to the insertion direction. The gripping arms include retaining portions configured to receive the cable therebetween and insertion portions configured to allow insertion of the cable towards the retaining portions. The gripping device includes first protrusions projecting from the retaining portions, extending along a first direction angled with respect to the insertion direction and configured to act on the cable to retain the cable between the retaining portions. The gripping device includes second protrusions projecting from the insertion portions and extending along a second direction angled with respect to the insertion direction, where each of the second protrusions being tapered along the insertion direction towards the respective end portion.

BRIEF DESCRIPTION OF THE DRAWINGS

Further characteristics and advantages will become more apparent by reading the following detailed description of some embodiments given as examples with reference to the accompanying drawings, wherein.

DETAILED DESCRIPTION OF ILLUSTRATIVE EMBODIMENTS

For the purposes of the present description and claims a cable is deemed to be an optical, electrical or hybrid cable. An optical cable comprises one or more optical fiber units, an outer sheath and, optionally, flexible strength members. An electrical cable comprises one or more conductive wire and an outer sheath. A hybrid cable comprises one or more optical cables and one or more electrical cables.

In various embodiments, the present disclosure provides a gripping device capable of facilitating insertion operations of cables and providing a firm engagement between the cable and the device itself, avoiding torsion or movements of the retained cable relative to the gripping device.

The Applicant has found that providing taper protrusions speeds up and facilitates the insertion of the cable, avoiding that the cable meets obstacles which could prevent correct insertion of the cables as well as damages of the cable itself.

Therefore, the present application relates to gripping device for retaining a cable, the gripping device comprising a base, two opposed gripping arms projecting from the base towards respective end portions along an insertion direction and mutually spaced apart along a transversal direction perpendicular to the insertion direction, the gripping arms having retaining portions configured to receive the cable therebetween and insertion portions configured to allow insertion of the cable towards the retaining portions, first protrusions projecting from the retaining portions, extending along a first direction angled with respect to the insertion direction and configured to act on the cable to retain the cable between the retaining portions, wherein the gripping device comprises second protrusions projecting from the insertion portions and extending along a second direction angled with respect the insertion direction, each second protrusion being tapered along the insertion portion towards the respective end portion.

Preferably, each second protrusion projects from the respective insertion portion for a height which tapers towards the respective end portion of the gripping arm along the second direction.

Preferably, the second protrusions define a tapering surface configured to engage the cable to guide the cable towards the retaining portions upon insertion of the cable along the insertion direction.

Preferably, each gripping arm extends between a first portion and an opposed second portion along a longitudinal direction perpendicular to the insertion direction and the transversal direction. The gripping arms are configured to receive the cable extending along the longitudinal direction between the first portions and the second portions.

Preferably, the insertion portions mutually approach along the longitudinal direction from the first portions towards the second portions.

Preferably, the retaining portions mutually approach along the longitudinal direction from the first portions towards the second portions to increase the grip of the first protrusions on the cable received between the second portions.

Preferably, the first protrusions are configured to act, along the transversal direction, on the cable received between the retaining portions to retain the cable along the longitudinal direction and prevent rotation of the cable around the longitudinal direction.

Preferably, each first protrusion has a sawtooth or triangular profile with a pointed free end configured to act on the cable to increase the grip on the cable received between the retaining portions.

Preferably, each free end of the first protrusions has a concave profile with concavity facing towards the opposed gripping arm, the concave profile being configured to centre along the insertion direction the cable received between the retaining portions.

Preferably, the first protrusions and the second protrusions are joined at a connection portion and each second protrusion has a sawtooth or triangular profile with a pointed free end at the connection portions.

Preferably, the insertion portions mutually space apart along the insertion direction towards the end portions to guide the cable towards the retaining portions upon insertion of the cable.

Preferably, the retaining portions mutually space apart along the insertion direction towards the base to prevent the cable from moving along the insertion direction towards the end portions when the cable is received between the retaining portions.

Preferably, the gripping arms are configured to elastically deform along the transversal direction and generate an elastic force along the transversal direction and directed towards the cable upon insertion of the cable between the retaining portions.

Preferably, each second protrusion has a width widening along the insertion portion towards the respective end portion to guide the cable towards the retaining portions upon insertion of the cable.

Figure 1:
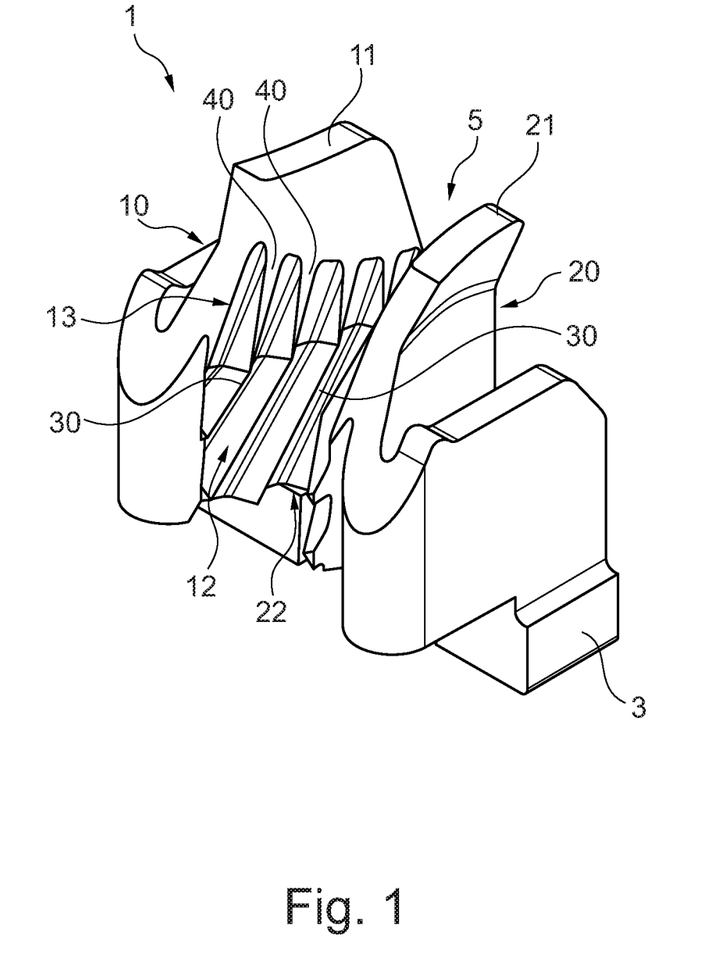
FIG. 1 is perspective view of the gripping device according to one embodiment of the present invention.

FIG. 1 shows a gripping device 1 for retaining a cable 2.

The gripping device 1 comprises a base 3 preferably attachable to a box for example a distribution box or electrical box (not shown) to attach the cable 2 to the box.

The gripping device 1 comprises two opposed gripping arms 10, 20 projecting from the base 3 towards respective end portions 11, 21 along an insertion direction Z-Z, preferably perpendicular to the base 3.

The gripping arms 10, 20 are mutually spaced apart along a transversal direction Y-Y perpendicular to the insertion direction Z-Z.

Preferably, the end portions 11, 21 define an insertion opening 4 through which the cable 2 firstly passes upon insertion of the cable 2 along the insertion direction Z-Z between the gripping arms 10, 20.

The gripping arms 10, 20 have retaining portions 12, 22 configured to receive the cable 2 therebetween and insertion portions 13, 23 configured to allow insertion of the cable 2 towards the retaining portions 12, 22 and, preferably, between the retaining portions 12, 22.

Preferably, the retaining portions 12, 22 are proximate to the base 3 and the insertion portions 13, 23 are proximate to the end portions 11, 21. Specifically, the retaining portions 12, 22 are downstream with respect to the insertion portions 13, 23 along the insertion direction Z-Z.

As shown in the figures, along the transversal direction Y-Y, the insertion portions 13, 23 are mutually spaced apart for an insertion distance Di and the retaining portions 12, 22 are mutually spaced apart for a retaining distance Dr.

Accordingly, the insertion portions 13, 23 define therebetween an insertion area 5 and retaining portions 12, 22 define therebetween a retaining area 6.

Preferably, each gripping arm 10, 20 extends between a first portion 14, 24 and an opposed second portion 15, 25 along a longitudinal direction X-X perpendicular to the insertion direction Z-Z and the transversal direction Y-Y. Specifically, the gripping arms 10, 20 are configured to receive the cable 2 extending along the longitudinal direction X-X between the first portions 14, 24 and the second portions 15, 25.

In detail, the insertion opening 4 is defined at the end portions 11, 21 and extends longitudinally between the first portions 14, 24 and second portions 15, 25 and transversally between the end portions 11, 21.

More preferably, first portions 14, 24 and second portions 15, 25 define respectively a first 7 and a second opening 8 for passage of the cable 2 along the longitudinal direction X-X. In detail, the gripping arms 10, 20 are configured to receive the optical cable 2 passing through the first opening 7 and second opening 8. More in detail, the first opening 7 and second opening 8 extend along the insertion direction Z-Z between the base 3 and the end portions 11, 21 and along the transversal direction Y-Y respectively between the first portions 14, 24 and the second portions 15, 25.

According to one embodiment, the insertion portions 13, 23 mutually space apart along the insertion direction Z-Z towards the end portions 11, 21 to guide the cable 2 towards the retaining portions 12, 22 upon insertion of the cable 2 through the insertion opening 4.

Figure 2:
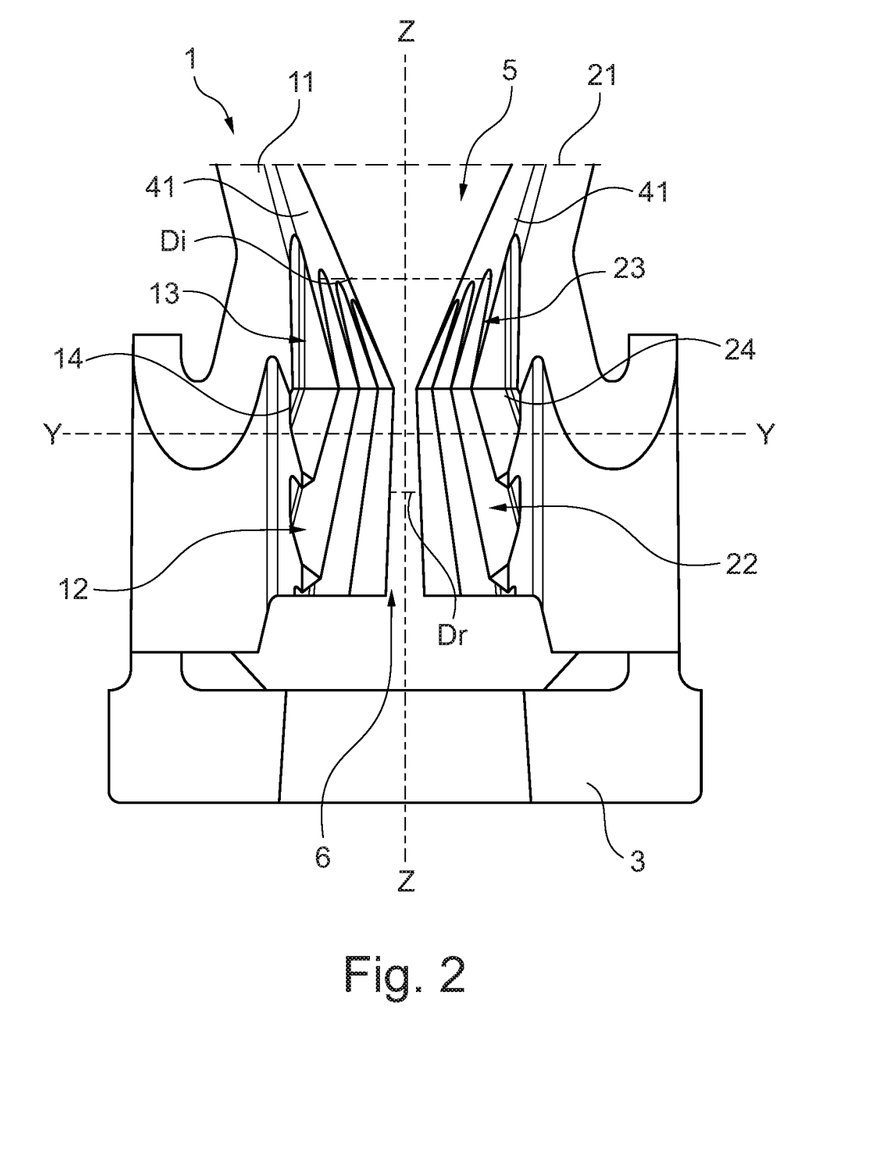
FIG. 2 is a front view of the gripping device of FIG. 1.

As shown in FIG. 2, the insertion portions 13, 23 mutually diverge along the insertion direction Z-Z towards the end portions 11, 21 increasing the insertion distance Di along the insertion direction Z-Z.

In other words, the insertion distance Di between the insertion portions 13, 23 gradually increases along the insertion direction Z-Z in order to define a V shaped insertion area 5. By this arrangement, the cable 2 is easily inserted between the gripping arms 10, 20 at the insertion portions 13, 23. This reduces the installation time of the cable 2.

According to one embodiment, the insertion portions 13, 23 mutually approach along the longitudinal direction X-X from the first portions 14, 24 towards the second portions 15, 25.

Figure 3:
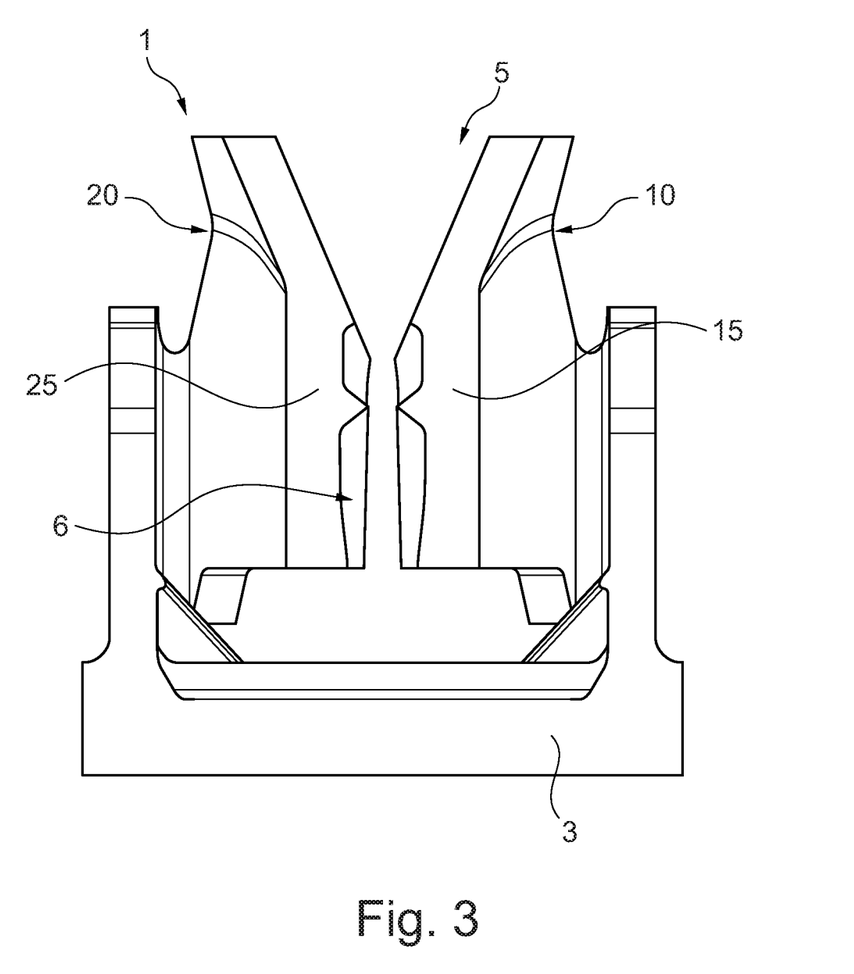
FIG. 3 is a back view of the gripping device of FIG. 1.
Figure 4:
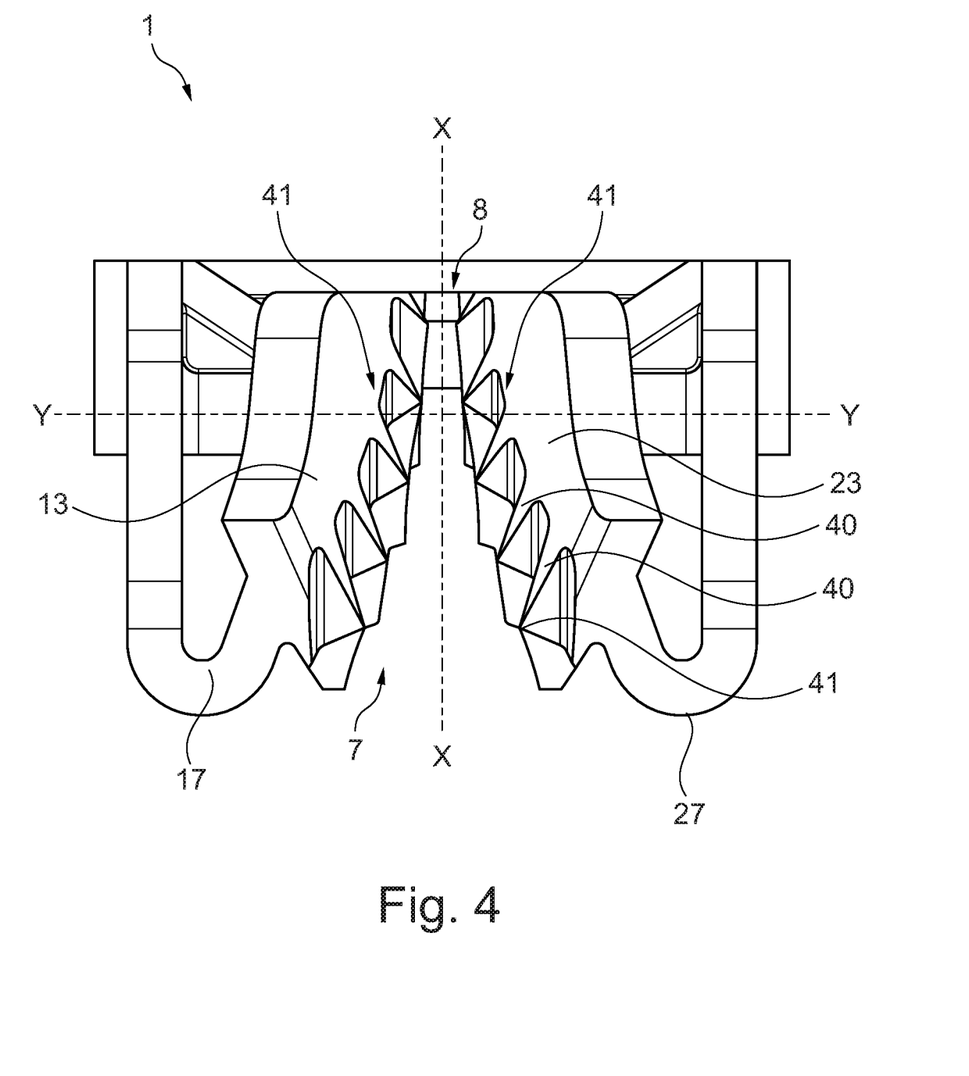
FIG. 4 is a top view of the gripping device of FIG. 1.

As shown in FIGS. 2-4, the insertion portions 13, 23 mutually converge along the longitudinal direction X-X from the first portions 14, 24 towards the second portions 15, 25 decreasing the insertion distance Di from the first portions 14, 24 to the second portion 15, 25.

In other words, the insertion distance Di between the insertion portions 13, 23 gradually decreases along the longitudinal direction X-X from the first portions 14, 24 to the second portions 15, 25.

According to one embodiment, the retaining portions 12, 22 mutually space apart along the insertion direction Z-Z towards the base 3 to prevent the cable 2 from moving along the insertion direction Z-Z towards the end portions 11, 21 when the cable 2 is received between the retaining portions 12, 22.

As shown in FIG. 2, the retaining portions 12, 22 mutually diverge along the insertion direction Z-Z towards the base 3 increasing the retaining distance Dr along the insertion direction Z-Z.

In other words, the retaining distance Dr between the retaining portions 12, 22 gradually increases along the insertion direction Z-Z in order to define an upside-down V shaped retaining area 6. This constrains the cable 2 along the insertion direction Z-Z towards the base 3 upon undesired movements of the cable 2 along the insertion direction Z-Z towards the end portions 11, 21

Accordingly, the cable 2 is pushed down along the insertion direction Z-Z towards the base 3 upon moving the cable 2 along the insertion direction Z-Z towards the end portions 11, 21.

According to one embodiment, the retaining portions 12, 22 mutually approach along the longitudinal direction X-X from the first portions 14, 24 towards the second portions 15, 25.

Figure 5:
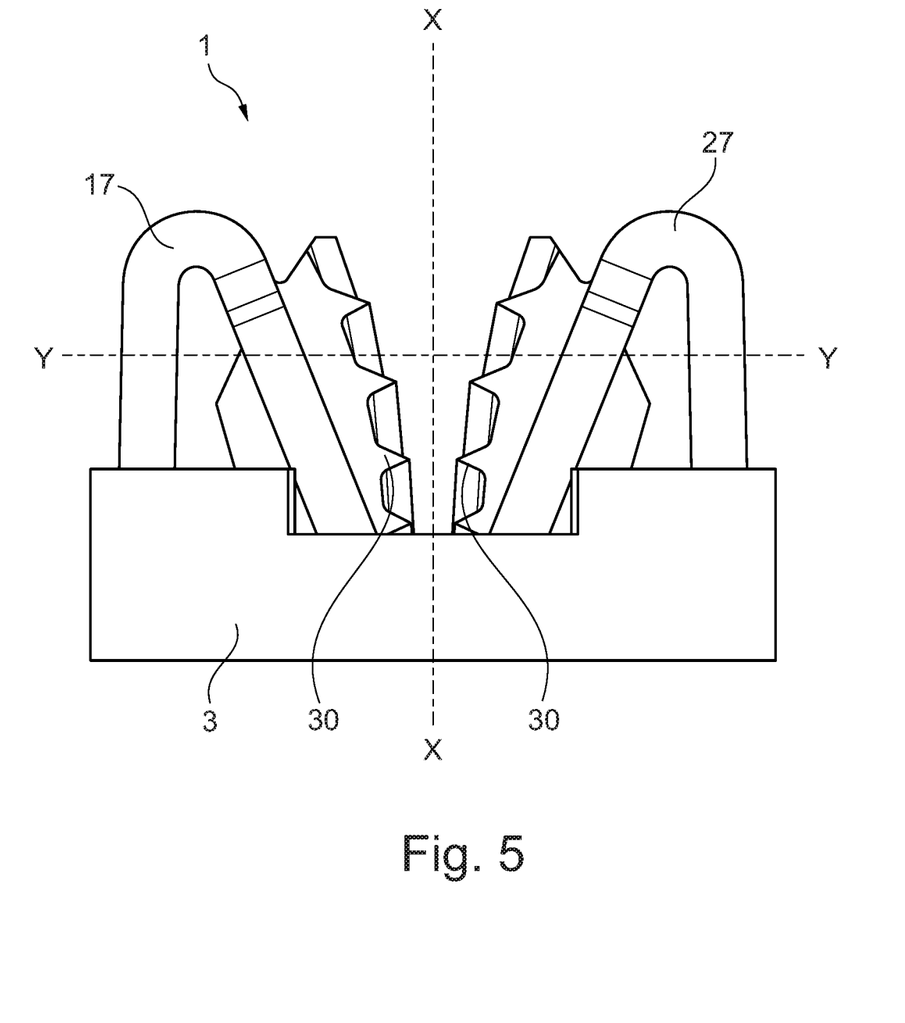
FIG. 5 is a bottom view of the gripping device of FIG. 1.
Figure 6:
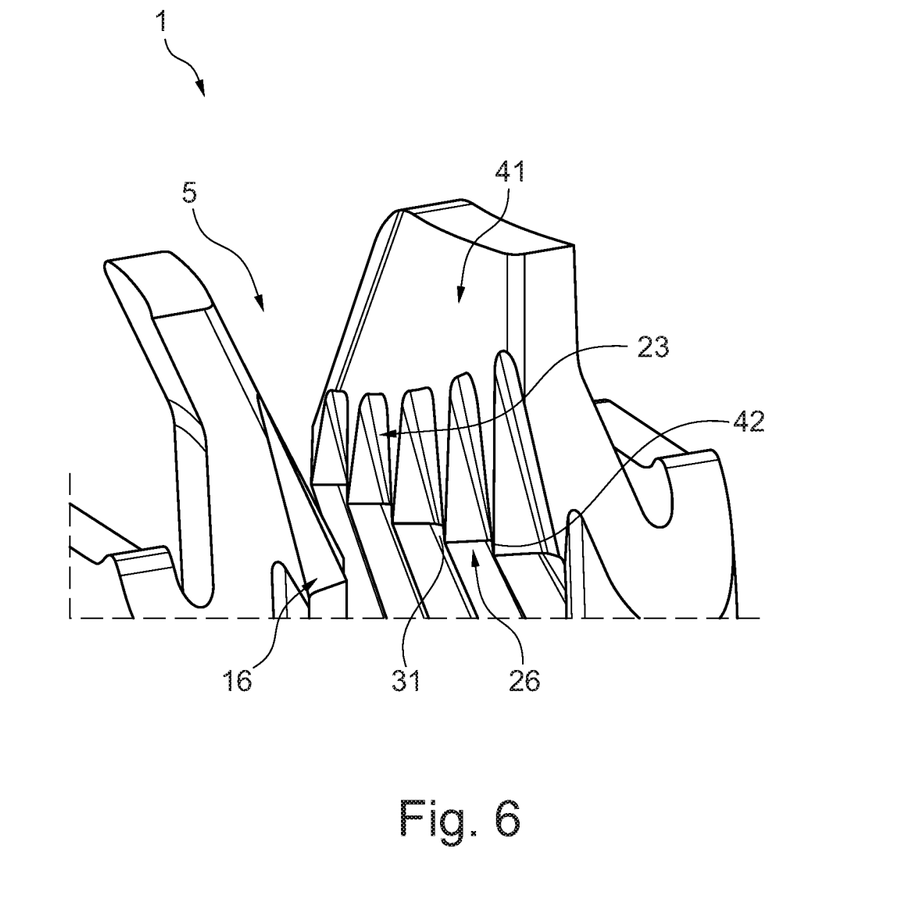
FIG. 6 is a view of detail of the of the gripping device of FIG. 1.
Figure 7:
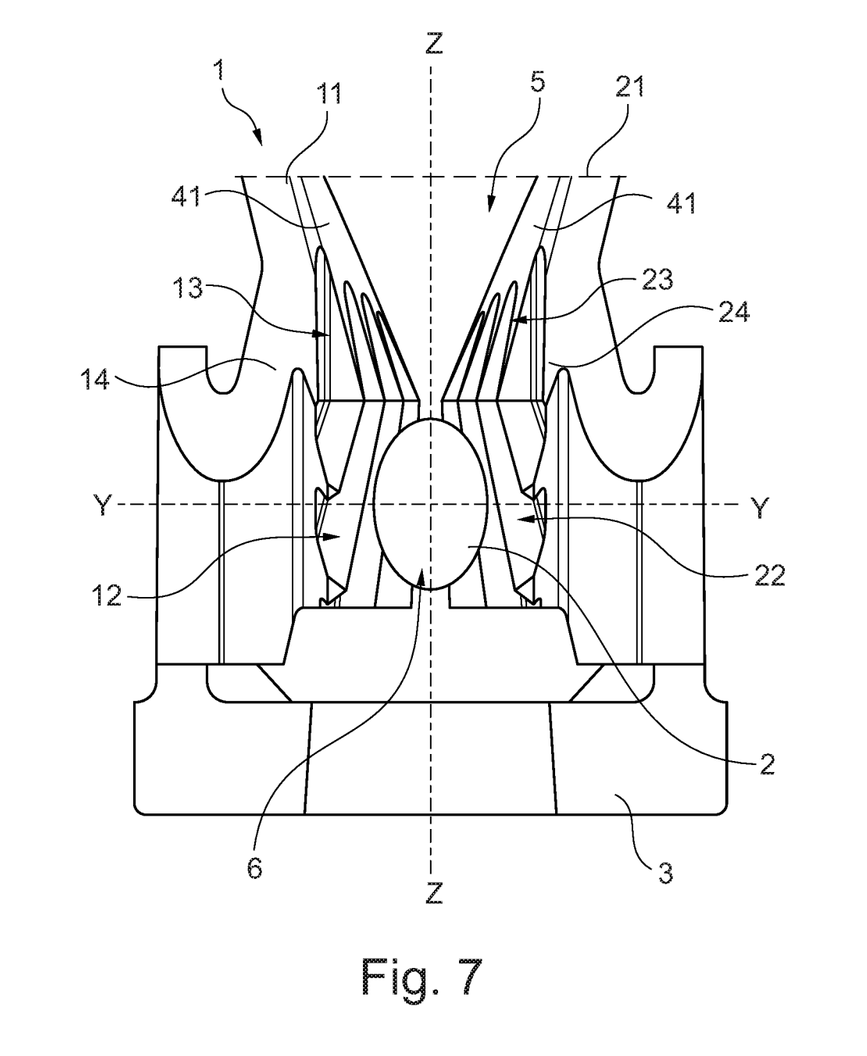
FIG. 7 is a front view of the gripping device of FIG. 1 with a retained cable.
Figure 8:
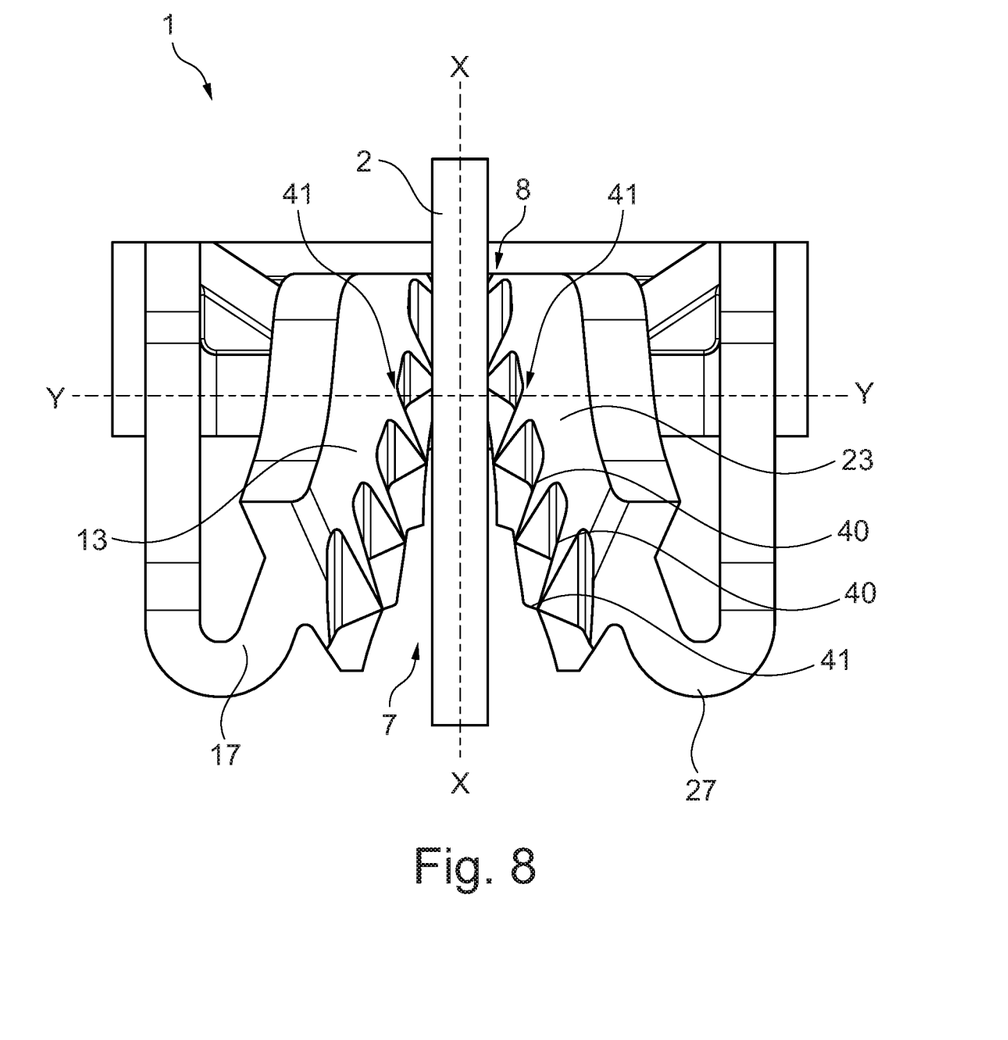
FIG. 8 is a top view of the gripping device of FIG. 1 with a retained cable.

As shown in FIGS. 2 and 5, the retaining portions 12, 22 mutually converge along the longitudinal direction X-X from the first portions 14, 24 towards the second portions 15, 25 decreasing the retaining distance Dr respectively.

In other words, the retaining distance Dr between the retaining portions 12, 22 gradually decreases along the longitudinal direction X-X from the first portions 14, 24 to the second portions 15, 25. This increases the action on the cable 2 at the second portions 15, 25.

Preferably, the gripping arms 10, 20 are configured to elastically deform along the transversal direction Y-Y and generate an elastic force along the transversal direction Y-Y. Specifically, the generated force is directed towards the cable 2 upon insertion of the cable 2 between the retaining portions 12, 22. In detail, the elastic force is directed towards the cable 2 received between the retaining portions 12, 22.

More preferably, each gripping arm 10, 20 comprises an elastic portion 17, 27 connected to the base 3 and configured to elastically deform the insertion portions 13, 23 and the retaining portions 12, 22 along the transversal direction Y-Y upon insertion of the cable 2.

Thanks to the provision of an elastic portion 17, 27, the insertion area 5 and the retaining area 6 may vary to allow the gripping device 1 to receive cables with different diameters. Moreover, the elastic portions 17, 27 provide a retaining action on the cable 2 received between the retaining portions 12, 22 reducing relative movement between the cable 2 and gripping device 1.

Thanks to the approaching of the retaining portions 12, 22 along the longitudinal direction X-X, the gripping arms 10, 20 at the retaining portions 12, 22 are configured to generate on the cable 2 an increasing elastic force along the longitudinal direction X-X from first portions 14, 24 to second portions 15, 25.

Thanks to the approaching of the retaining portions 12, 22 along the insertion direction Z-Z, the gripping arms 10, 20 at the retaining portions 12, 22 are configured to generate on the cable 2 an increasing elastic force along the insertion direction X-X from the base 3 to end portions 11, 21. Consequently, the gripping arms 10, 20 at the retaining portions 12, 22 are configured to counteract movement of the cable 2 along the insertion direction Z-Z towards the end portions 11, 21.

The gripping device 1 comprises first protrusions 30 projecting from the retaining portions 12, 22, extending along a first direction A-A angled with respect to the insertion direction Z-Z and configured to act on the cable 2 to retain the cable 2 between the retaining portions 12, 22.

Each first protrusion 30 projects from the respective retaining portion 13, 23 for a height preferably constant along the retaining portions 13, 23.

Preferably, the first direction A-A is inclined with respect the insertion direction Z-Z by an angle comprised in a range between 10° and 60°.

The first protrusions 30 are configured to provide additional torsion resistance avoiding the cable to rotate around the longitudinal direction X-X.

Preferably, the first protrusions 30 are configured to translate the cable 2 therealong towards the base 3 ensuring the retention of the cable 2 between the retaining portions 12, 22 when a pull force, at the first portions 14, 24 is applied to the retained cable 2 along the longitudinal direction X-X.

More preferably, the first protrusions 30 are configured to translate the cable 2 therealong towards the end portions 11, 21 when a push force, at the first portions 14, 24, is applied to the retained cable 2 along the longitudinal direction X-X.

Therefore, the approaching of the retaining portions 12, 22 combined with an increase of the elastic load pushes back the cable 2 towards the base 3 counteracting the push force and ensuring the cable 2 between the retaining portions 12, 22.

The first protrusions 30 are configured to act on the cable 2 to retain the cable 2 between the retaining portions 12, 22.

Preferably, the first protrusions 30 are configured to act, along the transversal direction Y-Y, on the cable 2 received between the retaining portions 12, 22.

Accordingly, the first protrusions 30 are configured to retain the cable 2 along the longitudinal direction X-X and to prevent rotation of the cable 2 around the longitudinal direction X-X.

According to one embodiment, the approaching of the retaining portions 12, 22 along longitudinal direction X-X from the first portions 14, 24 towards the second portions 15, 25 allows to increase the grip of the first protrusion 30 on the cable 2 at the second portions 15, 25.

Thanks to the combination of the approaching of the retaining portions 12, 22 along longitudinal direction X-X and the first protrusions 30, the gripping device 1 provides suitable tension and torsion resistance along the retained cable 2.

Preferably, the first protrusion 30 has a sawtooth or triangular profile with a pointed free end 31 configured to act on the cable 2 to increase the grip on the cable 2 received between retaining portions 12, 22.

More preferably, each free end 31 of the first protrusions 30 has a concave profile 32 with concavity facing towards the opposed gripping arm 10, 20. Specifically, the concave profile 32 is configured to centre along the insertion direction Z-Z the cable 2 received between the retaining portions 12, 22. The concave profile 32 has a slight radius, preferably in a range between 10 mm and 70 mm.

The gripping device 1 comprises second protrusions 40 projecting from the insertion portions 13, 23 and extending along a second direction B-B angled with respect the insertion direction Z-Z.

Each second protrusion 40 is tapered along the respective insertion portion 13, 23 towards the respective end portion 11, 21.

Preferably, the second direction B-B is inclined with respect the insertion direction Z-Z by an angle comprised in a range between 10° and 60°.

More preferably, each second protrusion 40 projects from the respective insertion portion 13, 23 for a height which tapers towards the respective end portion 11, 21 of the gripping arm 10, 20, along the second direction B-B. Specifically, the height of the second protrusions 40 gradually decreases along the second directions B-B from a starting height to a final height.

According to the preferred embodiment, the final height is zero while the starting height is comprised in range between 0.5 mm and 2 mm.

The second protrusions 40 define a tapering surface 41 configured to engage the cable 2 to guide the cable 2 towards the retaining portions 12, 22 upon insertion of the cable 2 along the insertion direction Z-Z.

Thanks to the tapering surface 41 the cable 2, upon insertion through the insertion opening 4, easily slides along the insertion portions 13, 23. This reduces installation time and damages on the cable 2.

According to preferred embodiment, the first direction A-A is inclined with respect to the second direction B-B by angle comprised in a range between −30° and 30°.

According to one embodiment, the first protrusions 30 and the second protrusions 40 are joined at a connection portion 16, 26.

Thanks to the joint between the first protrusion 30 and second protrusions 40, the cable 2 is able to slide smoothly from the insertion portions 13, 23 to the retaining portions 12, 22 along the insertion direction Z-Z.

Preferably, each second protrusion 40 has a sawtooth or triangular profile with a pointed free end 42 at the connection portions 16, 26. The same sawtooth or triangular profile of the first 30 and second protrusions 40 simplifies manufacturing of the gripping device 1.

More preferably, the first protrusions 30 and the second protrusions 40 have the same height at the connection portion 16, 26. Specifically, the height of the first protrusions 30 is equal to the starting height of the second protrusion 40.

According to one embodiment, each second protrusion 40 has a width widening along the insertion portion 13, 23 towards the respective end portion 11, 21 to guide the cable 2 towards the retaining portions 12, 22 upon insertion of the cable 2. Preferably, the width of each second protrusion 40 widens from the pointed free end 42 towards the retaining portion 10, 20.

Accordingly, the widening of the second protrusions 40 widens the tapering surface 41 allowing the second protrusions 40 to better engage the cable at the insertion portions 13, 23.

Figure 9:
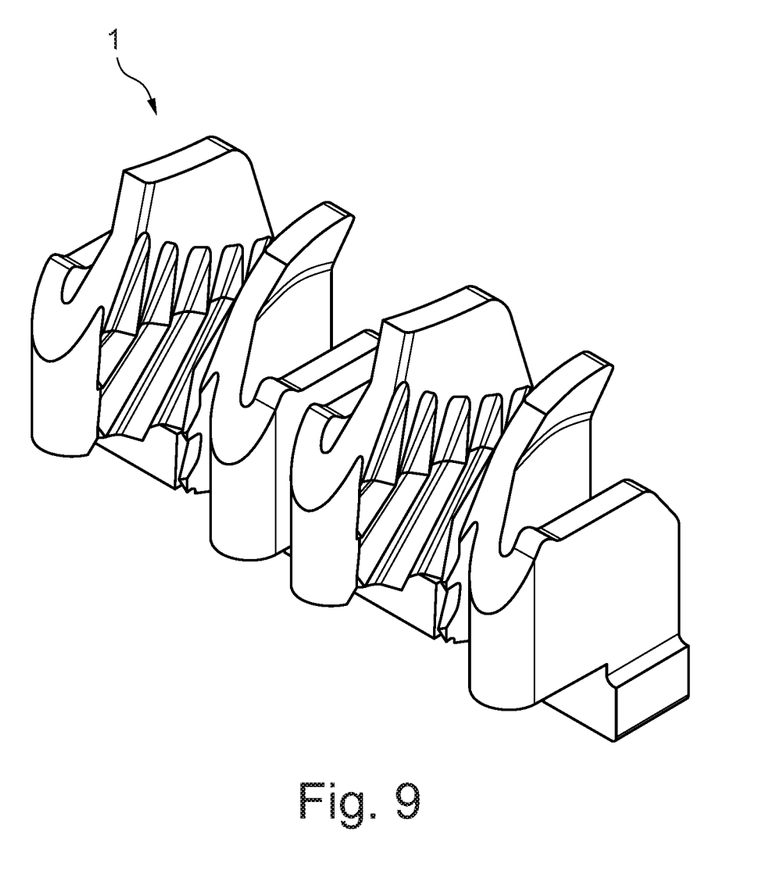
FIG. 9 is perspective view of the gripping device according to one embodiment of the present invention.

According to one embodiment, the gripping devices 1 can be realized in one piece in plastic material or in metal. Preferably, the gripping devices 1 is produced through injection moulding process. More preferably, one or more gripping device 1 are mutually connected at the base 3 along the transversal direction Y-Y as shown in FIG. 9.

In the present description and claims, unless otherwise specified, all the numbers and values should be intended as preceded by the term "about". Also, all ranges include any combination of the maximum and minimum points disclosed and include any intermediate ranges therein, which may or may not be specifically enumerated herein.

What is claimed is:

1. A gripping device for retaining a cable, the gripping device comprising:
   a base;
   two opposed gripping arms projecting from the base towards respective end portions along an insertion direction and mutually spaced apart along a transversal direction perpendicular to the insertion direction, the gripping arms comprising retaining portions configured to receive the cable therebetween and insertion portions configured to allow insertion of the cable towards the retaining portions;
   first protrusions projecting from the retaining portions, extending along a first direction angled with respect to the insertion direction and configured to act on the cable to retain the cable between the retaining portions; and
   second protrusions projecting from the insertion portions and extending along a second direction angled with respect to the insertion direction, each of the second protrusions being tapered along the insertion direction towards the respective end portion.

2. The gripping device according to claim 1, wherein each of the second protrusions project from the respective insertion portion for a height which tapers towards the respective end portion of the gripping arm along the second direction.

3. The gripping device according to claim 1, wherein the second protrusions define a tapering surface configured to engage the cable to guide the cable towards the retaining portions upon insertion of the cable along the insertion direction.

4. The gripping device according to claim 1, wherein the first protrusions are configured to act, along the transversal direction, on the cable received between the retaining portions to retain the cable along a longitudinal direction and prevent rotation of the cable around the longitudinal direction.

5. The gripping device according to claim 1, wherein each of the first protrusions has a sawtooth or triangular profile with a pointed free end configured to act on the cable to increase the grip on the cable received between the retaining portions.

6. The gripping device according to claim 5, wherein each free end of the first protrusions has a concave profile with concavity facing towards the opposed gripping arm, the concave profile being configured to center, along the insertion direction, the cable received between the retaining portions.

7. The gripping device according to claim 1, wherein:
the first protrusions and the second protrusions are joined at a connection portion, and
each of the second protrusions has a sawtooth or triangular profile with a pointed free end at the connection portions.

8. The gripping device according to claim 1, wherein the insertion portions are mutually spaced apart along the insertion direction towards the end portions to guide the cable towards the retaining portions upon insertion of the cable.

9. The gripping device according to claim 1, wherein the retaining portions are mutually spaced apart along the insertion direction towards the base to prevent the cable from moving along the insertion direction towards the end portions when the cable is received between the retaining portions.

10. The gripping device according to claim 1, wherein the gripping arms are configured to elastically deform along the transversal direction and generate an elastic force along the transversal direction and directed towards the cable upon insertion of the cable between the retaining portions.

11. The gripping device according to claim 1, wherein each of the second protrusions has a width widening along the insertion portion towards the respective end portion to guide the cable towards the retaining portions upon insertion of the cable.

12. A gripping device for retaining a cable, the gripping device comprising:
a base;
first and second gripping arms projecting from the base towards respective end portions along an insertion direction and mutually spaced apart along a transversal direction perpendicular to the insertion direction, the first gripping arm being opposite the second gripping arm, the first and second gripping arms comprising first and second retaining portions configured to receive the cable therebetween and first and second insertion portions configured to allow insertion of the cable towards the first and second retaining portions;
first protrusions projecting from the first and second retaining portions, extending along a first direction angled with respect to the insertion direction and configured to act on the cable to retain the cable between the first and second retaining portions; and
second protrusions projecting from the first and second insertion portions and extending along a second direction angled with respect to the insertion direction, each of the second protrusions being tapered along the insertion direction towards the respective end portion, each of the first and second gripping arms extending between a first portion and an opposed second portion along a longitudinal direction perpendicular to the insertion direction and the transversal direction, the first and second gripping arms being configured to receive the cable extending along the longitudinal direction between the first portions of the gripping arms and the opposed second portions of the gripping arms.

13. The gripping device according to claim 12, wherein the first and second insertion portions mutually approach along the longitudinal direction from the first portions of the gripping arms towards the second portions of the gripping arms.

14. The gripping device according to claim 12, wherein the first and second retaining portions mutually approach along the longitudinal direction from the first portions of the gripping arms towards the second portions of the gripping arms to increase the grip of the first protrusions on the cable received between the second portions of the gripping arms.

15. The gripping device according to claim 12, wherein each of the first protrusions has a sawtooth or triangular profile with a pointed free end configured to act on the cable to increase the grip on the cable received between the first and second retaining portions.

16. The gripping device according to claim 15, wherein each free end of the first protrusions has a concave profile with concavity facing towards the opposed gripping arm of the first and second gripping arms, the concave profile being configured to center, along the insertion direction, the cable received between the first and second retaining portions.

17. The gripping device according to claim 12, wherein:
the first protrusions and the second protrusions are joined at a connection portion, and
each of the second protrusions has a sawtooth or triangular profile with a pointed free end at the connection portions.

18. The gripping device according to claim 12, wherein the first and second insertion portions are mutually spaced apart along the insertion direction towards the end portions to guide the cable towards the first and second retaining portions upon insertion of the cable.

19. The gripping device according to claim 12, wherein the first and second retaining portions are mutually spaced apart along the insertion direction towards the base to prevent the cable from moving along the insertion direction towards the end portions when the cable is received between the first and second retaining portions.

20. The gripping device according to claim 12, wherein the first and second gripping arms are configured to elastically deform along the transversal direction and generate an elastic force along the transversal direction and directed towards the cable upon insertion of the cable between the first and second retaining portions.

* * * * *